Patented June 24, 1941

2,247,206

UNITED STATES PATENT OFFICE 2,247,206

METHOD FOR MAKING MOLDABLE LIGNO-CELLULOSIC MATERIAL AND PRODUCT THEREOF

Arlie W. Schorger and John H. Ferguson, Madison, Wis., assignors to Burgess Cellulose Company, Freeport, Ill., a corporation of Delaware No Drawing. Application November 25, 1938, Serial No. 242,326

14 Claims. (Cl. 106—39)

This invention relates to improved methods for treating lignocelluloses to produce products which upon drying may be hot-molded into hard, resinous material. The invention also relates to the product produced thereby.

It is an object of this invention to improve the prior processes for making the plastic lignocellulose products referred to above and products formed thereby, to render the products more plastic and stronger.

Briefly the primary process of the prior art consists in cooking a natural lignocellulosic material with water, alone or with added materials, within a limited range of temperatures and for a predetermined time to render water-soluble a part of the lignocellulosic material and to particularly dissolve the hemicelluloses. The residual product, after extraction of the water-solubles and subsequent drying, contains a large part of the original thermoplastic resinous lignin, as well as cellulosic fiber intrisically unchanged. This product may be hot-molded under pressure, but without the addition of a binder, into a hard, resinous product having a high strength and a high resistance to the absorption of water.

The raw material for the process is any natural lignocellulosic material such as wood, corn cobs, straw, bagasse, cornstalks, etc. When a natural lignocellulosic material is referred to herein it includes manufactured products, such as newsprint containing, for example, 70%–90% of coniferous ground wood. The ground wood therein is substantially in its original or natural condition.

The lignocellulosic material, after being ground or otherwise comminuted, is cooked at elevated temperatures with water. Part of the hemicelluloses or other binding materials are thereby dissolved. The time, temperature, and pressure used during the cooking operation may vary within limits depending upon the specific properties desired in the final product. During the cooking operation small amounts of the volatile acids, acetic and formic, are formed from the lignocellulose. When these acids are not neutralized there is loss of strength in the finished product, but the plasticity is increased somewhat. The latter effect can also be enhanced by the addition of small amounts of an inorganic acid, such as sulphuric acid. It is preferable, however, to add prior to cooking sufficient alkali to neutralize the volatile organic acids formed during the cook, for example, 2% to 5% (of the air dried weight of the wood) of sodium carbonate or sodium hydroxide, depending upon the kind of lignocellulose used. These alkalies continuously neutralize the acids produced. Care should be taken that the alkalinity is not too great because the lignin may be attacked thereby decreasing the amount of binder available in the molding compound.

When the procedure outlined above is followed the lignin is not dissolved but remains associated with the cellulose in about the same form that it was prior to the cooking operation. After removal of the water-soluble hemicellulose products by a washing operation, the remaining lignocellulose is thermoplastic to a sufficient degree so that it may be used for hot-molding operations. For molding purposes it is preferably disintegrated into a powder.

The invention described and claimed herein has for its puurpose the rearrangement of the physical and chemical relationship between the lignin and the cellulose to increase the plasticity of the lignocellulose and also to improve its other physical properties. This is effected by adding an organic solvent for lignin to the aqueous cooking liquor during the cooking operation, the solvent being removed at the end of the cooking operation.

It has been known that when natural lignocelluloses are heated under pressure for a sufficient length of time with a mixture of water and certain organic compounds, for example, equal parts by volume of water and ethyl alcohol, a pulping effect is obtained and the lignin can be dissolved in whole or in large part, leaving a residue consisting largely of cellulose. We have discovered that when lignocelluloses are heated under the above conditions and the cook is so handled that the cellulose and lignin are again left in intimate contact by removing the organic solvent from the cook, a lignocellulose material is obtained that molds readily under heat and pressure.

The preferred procedure is to so limit the amount of solvent (water plus organic solvent) in the cook that it is completely or nearly completely absorbed by the lignocellulose. Excellent results have been obtained by using two parts by weight of the solvent to one part by weight of the wood, although when three parts were used there was still complete absorption. After heating under pressure, usually at 150° C. to 210° C. for ½ to 3 hours, and cooling, the lignocellulose does not appear to have undergone any visible change other than a darkening in color. After the cook is completed the organic solvent is removed, the lignocellulose residue is washed with water to remove carbohydrates and other solubles and dried. The material is then moldable under heat and pressure to give dense, strong products. The organic portion of the solvent appears to dissolve a portion of the lignin, bringing it to the surface so as to uniformly coat the lignocellulose particles. Whatever the reaction mechanism may be, the method has for its purpose effecting a sufficient change in the lignin by the organic solvent in water solution to give the desired improvement in the plastic. At the same time there is sufficient water present to hydrolyze and render soluble a large part of the hemicelluloses. The lignocellulose residues so obtained is more plastic than when water alone is used as the cooking medium.

The most suitable solvents are the stable organic compounds miscible with water at room temperature or at the temperature prevailing during the cook. Following are some of the suitable organic solvents: Alcohols: particularly the low boiling-point alcohols such as methyl, ethyl, propyl, butyl, and amyl; ethylene glycol and glycerol, and their monomethyl and monobutyl ethers. Ketones: acetone; methyl ethyl ketone; diacetone alcohol; acetoacetic ester. Aldehydes: acetaldehyde; propaldehyde; furfural; aldol. Ethers: ethyl-propyl ether; dioxane; methylal.

The pressure during the cook may be increased beyond that produced by the mixed solvents by the introduction of nitrogen or other inert gas, or by other suitable means without departing from the scope of the invention. The ordinary alcohol such as ethyl alcohol is preferred because of its efficiency, low cost and ease of recovery for further use. It is usual to use it in a 40% to 50% solution. The active organic solvent, if volatile at the temperatures used, may be removed at the end of the cook preferably by relief of the digester, by direct or vacuum distillation, or by distillation with steam. Mixtures of the above organic solvents may be used. It also is possible to add to the miscible solution of water and organic compound hydrocarbons which are only slightly soluble in water. Such hydrocarbons are pinene, hexane, benzene, toluene and substituted hydrocarbons such as carbon tetrachloride and chloroform.

Other materials may be added to the cook. For example, it is possible to increase the lignin content of the molding compound by adding to the cook lignin obtained from other sources. Such lignin may be obtained from "black liquor" obtained in certain pulp cooking operations and particularly the lignin obtained by means of alcohol cooks such as butanol cooks used for the preparation of paper pulp. Aniline and similar aromatic amines may be added to the cook. These are limited in amount and usually should not exceed the amount which is fixed during the cook. The solvent is also a convenient carrier for added natural or synthetic resins or for compounds from which synthetic resins may be produced during the cooking operation; or waxes such as paraffin and montan; drying oils such as linseed and tung oil.

Larger volumes of solvent may, however, be used than that which can be absorbed by the lignocellulosic material. For example, up to twelve parts of the solvent are used to one part of the lignocellulose material, the cooking temperature being 150° C. to 210° C. and the time ½ to 3 hours. The organic solvent is removed as described. In this way, with suitable agitation of the raw material the lignin which has been dissolved out of the lignocelluse by the solution, is deposited in intimate contact with the cellulose. The organic solvent is usually mixed with one to four parts of water. Smaller proportions of organic solvent may be used which may decrease the benefits derived. The invention, however, is not limited to those proportions which give the maximum benefits. When the larger proportions of solvent are used it is obvious that the cook is "wet" rather than "dry" when 2 or 3 parts of solvent are used. When a wet cook is used dissolved lignin enters the solvent external to the lignocellulosic material.

Following are specific examples which illustrate practical embodiments of our process so that those skilled in the art may practice it. The time of molding given is for articles about 0.10 to 0.20 inch thick. The invention is not limited to the specific examples.

1. One part of ash wood, preferably in the form of sawdust or fine chips, and 5 parts of ethyl alcohol, 50% by volume, are heated at a temperature of 165° C. for two hours. The alcohol is distilled off, the residue washed with water, dried, ground, mixed with 1% of zinc stearate, and molded at a temperature of 180° to 185° C. under a pressure of 3000 pounds to the square inch. Molded objects made in accordance with the above procedure had a modulus of rupture of 9000 pounds per square inch. They had a water absorption of 5.9% when immersed in water for 24 hours at room temperature.

2. One part of ash wood and 3 parts of ethyl alcohol, 50% by volume, are heated for one hour at 180° C. Subsequent treatment as in Example 1. This method produced a molded object having a modulus of rupture of 10,076 pounds per square inch.

3. One part of aspen and 2 parts of ethyl alcohol, 50% by volume, are heated for one hour at 180°. Subsequent treatment as in Example 1. This procedure produced a molded object having a modulus of rupture of 10,400 pounds. Its water absorption was 6.9%.

4. One part of ash wood, 3% of sodium hydroxide (based on the air dried weight of wood), and 2 parts of 50% ethyl alcohol by volume, are heated 1 hour at 190° C. Subsequent procedure as in Example 1. This method produced a molded object having a modulus of rupture of 9,760 pounds per square inch and a water absorption of 5.3%.

5. One part of yellow pine and 2 parts of 50% ethyl alcohol by volume are heated 1 hour at 185° C. Subsequent procedure as in Example 1. A molded object produced by this method had a water absorption of 1.9% during 24 hours immersion and a modulus of rupture of 5,813 pounds per square inch.

6. One part of ash wood and 2 parts of a mixture of equal parts by volume of water and acetone are heated for 1 hour at 180° C. Subsequent procedure as in Example 1. The molded object produced by this method had a modulus of rupture of 8,206 pounds per square inch and a water abssorption of 4.3%.

7. One part of aspen, 2% of aniline (based on the wood) and 2 parts of 50% ethyl alcohol by volume are heated for 3 hours at 165° C. Subsequent procedure as in Example 1. A molded object produced by this method had a modulus rupture of 11,000 pounds per square inch.

8. One part of ash wood and two parts of a mixture of equal volumes of water and butanol are heated at 190° C. for one hour. The alcohol is evaporated, the residue washed with water, dried at 105° C., mixed with 1% zinc stearate, and molded under heat and pressure. The molded piece had a modulus of rupture of 8,206 pounds per square inch and the water absorption was 5.2% in 24 hours.

9. One part of maple, one part of a mixture of 20% butanol and 80% water by volume, 5% of aniline and 5% of calcium carbonate (based on the wood) are heated at 185° C. for 30 minutes. The solvent is removed, the residue washed, dried, and molded as usual. The modulus of rupture was 8,350 pounds and the water absorption 2.26% in 24 hours.

10. The same as Example 8 except that the cooking liquor consists of a mixture of equal parts by volume of water and dioxane. The modulus of rupture was 8,102 pounds per square inch and the water absorption was 4.9% in 24 hours.

11. The same as Example 8 except that the cooking liquor consists of 3 parts of 50% ethyl alcohol by volume and one-tenth part of pinene. The modulus of rupture was 8,528 pounds per square inch and the water absorption was 5.7% in 24 hours.

12. Any of the primary plastics of the previous examples are molded in the presence of 0.5% to 10.0% of water.

When reference is made herein to organic solvents for lignin there is included compounds which vary over a wide range with respect to the solubility of the lignin therein, for example, methyl, ethyl and butyl alcohols, acetone and dioxane may be mentioned as being among the better solvents whereas glycerol is a much poorer solvent. The above compounds are miscible with water particularly at the cooking temperatures. It is obvious that the poorer solvents are of less value commercially. Among the listed compounds immiscible with water chloroform is a good solvent for lignin whereas the others listed are very poor solvents or non-solvents.

We claim:

1. The method of preparing a thermoplastic material having the property of high plastic flow under heat and pressure molding conditions of 185° C. and 3000 pounds per square inch respectively, with formation of hard, water-resistant, resin-like products, which comprises cooking a subdivided natural lignocellulosic material at a temperature of approximately 150° C. to 210° C. for up to 3 hours with a liquor comprising a mixture of water and a neutral organic solvent for lignin to render water-soluble at least a part of the hemicelluloses and effect a dissolving action upon the lignin of said natural lignocellulosic material, said organic solvent being water-miscible and stable under said cooking conditions and said liquor being present in an amount such that it is substantially completely absorbed by the lignocellulose during the cook, removing said organic solvent from said cook without removing the lignin therefrom and water-washing the residue to remove water-solubles therefrom.

2. The method of claim 1 in which the organic solvent comprises 20% to 80% by weight of the cooking liquor.

3. The method of preparing a thermoplastic material having the property of high plastic flow under heat and pressure molding conditions of 185° C. and 3000 pounds per square inch respectively, with formation of hard, water-resistant, resin-like products, which comprises cooking a subdivided natural lignocellulosic material at a temperature of approximately 150° C. to 210° C. for up to 3 hours with a mixture of water and an organic solvent for lignin to render water-soluble at least a part of the hemicelluloses and effect a dissolving action upon the lignin of said natural lignocellulosic material, removing said organic solvent from said cook without removing the lignin therefrom, and water-washing the residue to remove water-solubles therefrom, said organic solvent being water-miscible and stable under said cooking conditions.

4. The method of claim 1 in which the organic solvent consists of a material from the group consisting of the alcohols, ketones, aldehydes and ethers.

5. The method of claim 1 in which the organic solvent is a low boiling-point alcohol.

6. The method of claim 1 in which the organic solvent in the cooking liquor is distillable from the completed cook, and in which said organic solvent is removed by distillation.

7. The method of claim 3 in which the combined water and organic solvent is present during the cook in an amount from 2 to 12 times the air dry weight of the natural lignocellulosic material.

8. The method of claim 1 in which the cooking liquor is present during the cook in amount from 2 to 3 times the air dry weight of the natural lignocellulosic material.

9. The method of preparing a thermoplastic material having the property of high plastic flow under heat and pressure molding conditions of 185° C. and 3000 pounds per square inch respectively, with formation of hard, water-resistant, resin-like products, which comprises cooking a natural lignocellulosic material at a temperature of approximately 150° C. to 210° C. for up to 3 hours with a mixture of water and a neutral organic solvent for lignin to render water-soluble at least a part of the hemicelluloses and effect a dissolving action upon the lignin of said natural lignocellulosic material, said organic solvent being water-miscible and stable under said cooking conditions, removing said organic solvent from said cook without removing the lignin therefrom, and water-washing, drying and reducing the residue to a powder.

10. The method of preparing a thermoplastic material having the property of high plastic flow under heat and pressure molding conditions of 185° C. and 3000 pounds per square inch respectively, with formation of hard, water-resistant, resin-like products, which comprises cooking a subdivided natural lignocellulosic material at a temperature of approximately 150° C. to 210° C. for up to 3 hours with a mixture of water and ethyl alcohol to render water-soluble at least a part of the hemicelluloses and effect a dissolving action upon the lignin of said natural lignocellulosic material, the cooking liquor being present in an amount such that it is substantially completely absorbed by the lignocellulose during the cook, distilling the alcohol from the cooked product and water-washing the de-alcoholized material.

11. The method of preparing a hard, water-resistant, resinous product which comprises cooking a subdivided natural lignocellulosic material at a temperature of approximately 150° C. to 210° C. for up to 3 hours with a mixture of water and an organic solvent for lignin to render water-soluble at least a part of the hemicelluloses and effect a dissolving action upon the lignin of said natural lignocellulosic material, said cooking liquor being present in an amount such that it is substantially entirely absorbed by the lignocellulose during the cook, said organic solvent being water-miscible and stable under said cooking conditions, removing said organic solvent from said cook without removing the lignin therefrom, water-washing the residue to remove water-solubles therefrom, and molding said washed product under heat and pressure into final form.

12. A hard, water-resistant, resinous thermoplastic molded product, comprising a treated natural lignocellulose which has the lignin thereof in modified condition and is substantially free of the water-solubles contained in a natural lignocellulose after being cooked under the hereinafter prescribed conditions, said product being the product of cooking a natural lignocellulose with a mixture of water and an organic solvent for lignin at a temperature of approximately 150° C. to 210° C. for up to 3 hours, said cooking liquor being present in an amount such that it is substantially entirely absorbed by said lignocellulose during the cook, and removing said organic solvent without removing the lignin from the cook.

13. A comminuted material having the property of plastic flow under heat and pressure molding conditions of 185° C. and 3000 pounds per square inch respectively, with formation of hard, water-resistant, resin-like products, comprising a treated natural lignocellulosic material having the lignin thereof in modified condition and being substantially free of the water-solubles contained in a natural lignocellulose after cooking under the hereinafter prescribed conditions, said treated lignocellulose being the product of cooking a natural lignocellulose with a mixture of water and an organic solvent for lignin at a temperature of approximately 150° C. to 210° C. for up to 3 hours, said cooking liquor being present in an amount such that it is substantially entirely absorbed by said lignocellulose during the cook, removing the organic solvent without removing the lignin from the cook, and water-washing the residue of the cook.

14. The method of claim 9 in which the mass is agitated during removal of the organic solvent.

ARLIE W. SCHORGER.
JOHN H. FERGUSON.